United States Patent

Flinders et al.

[15] 3,646,516

[45] Feb. 29, 1972

[54] ERROR-DETECTING CIRCUITRY

[72] Inventors: Michael Flinders, Chandler's Ford; Peter Lycett Gardner, Bishops Sutton; Michael Henry Hallett, Chandler's Ford; John W. Jones; John Francis Minshull, both of Winchester; Keith Graham Taylor, Chandler's Ford, all of England

[73] Assignee: International Business Machines Corporation, Armonk, N.Y.

[22] Filed: Apr. 15, 1970

[21] Appl. No.: 28,900

[30] Foreign Application Priority Data

Apr. 24, 1969 Great Britain ......................20,902/69

[52] U.S. Cl. ......................................340/146.1, 340/172.5

[51] Int. Cl. ......................................................G06f 11/00

[58] Field of Search ....................340/146.1, 172.5; 235/153

[56] References Cited

UNITED STATES PATENTS

| | | | |
|---|---|---|---|
| 3,409,879 | 11/1968 | Keister | 340/146.1 X |
| 3,248,704 | 4/1966 | Roth et al. | 340/172.5 |
| 3,333,243 | 7/1967 | Hamburgen | 340/146.1 |
| 3,354,436 | 11/1967 | Winder | 340/173.5 |

*Primary Examiner*—Charles E. Atkinson
*Attorney*—Hanifin and Jancin and Norman R. Bardales

[57] ABSTRACT

Error detection circuitry employs duplicate equal order binary registers and comparison circuitry for detecting and diagnosis of errors in data bits being transferred between the storage registers and a data bus.

10 Claims, 7 Drawing Figures

INVENTORS
MICHAEL FLINDERS
PETER LYCETT GARDNER
MICHAEL HENRY HALLETT
JOHN WYN JONES
JOHN FRANCIS MINSHULL
KEITH GRAHAM TAYLOR

BY Norman R Bardales
ATTORNEY

SEARCH PHASE

READ/WRITE PHASE

ERROR-DETECTING CIRCUITRY

BACKGROUND OF THE INVENTION

1. Field of the Invention

This invention relates to error detecting circuitry.

2. Description of the Prior Art

In electronic digital data processing systems, data transfer takes place on data transfer buses and there is sometimes difficulty in detecting the presence of errors in data transmitted to the buses especially when data is transmitted to a bus simultaneously from several sources. In such a case, error checking codes are not applicable, since, even if a code which detects errors in merged data were designed, it would be difficult to trace the source of the error.

Duplication of components is a well-tried technique in data processing, but mere duplication is only sufficient to indicate that an error has occurred.

SUMMARY OF THE INVENTION

It is an object of this invention to provide an improved error detection circuitry.

According to the invention, error-detecting circuitry is provided which includes first and second equal-order binary data storage registers, comparison means connected between the registers, and a data transfer bus. In addition, data driver circuitry is provided and is arranged in operation to transmit binary bits of the same binary state, e.g., ones (or alternatively zeros), to the data bus in accordance with the contents of the first data register. First data receiver circuitry is also provided and arranged in operation to transmit binary bits of the aforementioned same binary state to the first data register in accordance with the data on the data transfer bus, and second data receiver circuitry is provided and arranged in operation to transmit binary bits of the aforementioned same binary state to the second data register. The data driver circuitry and the second data receiver circuitry are operated simultaneously and the comparison means is arranged upon operation of the data driver circuitry to provide an error signal in the absence of a binary bit in the aforementioned same binary state in any order of the second data register, when the same order of the first data register contains a binary bit having the aforementioned same binary state.

The invention is preferably used in an associative storage system in which the data registers comprise the respective input/output registers for duplicated storage arrays in which the states of the selector triggers are compared.

The foregoing and other objects, features and advantages of the invention will be apparent from the following more particular description of the preferred embodiments of the invention, as illustrated in the accompanying drawing.

BRIEF DESCRIPTION OF THE DRAWING

In the figures, like elements are designated with similar reference numerals.

DESCRIPTION OF THE PREFERRED EMBODIMENTS

Figure 1:
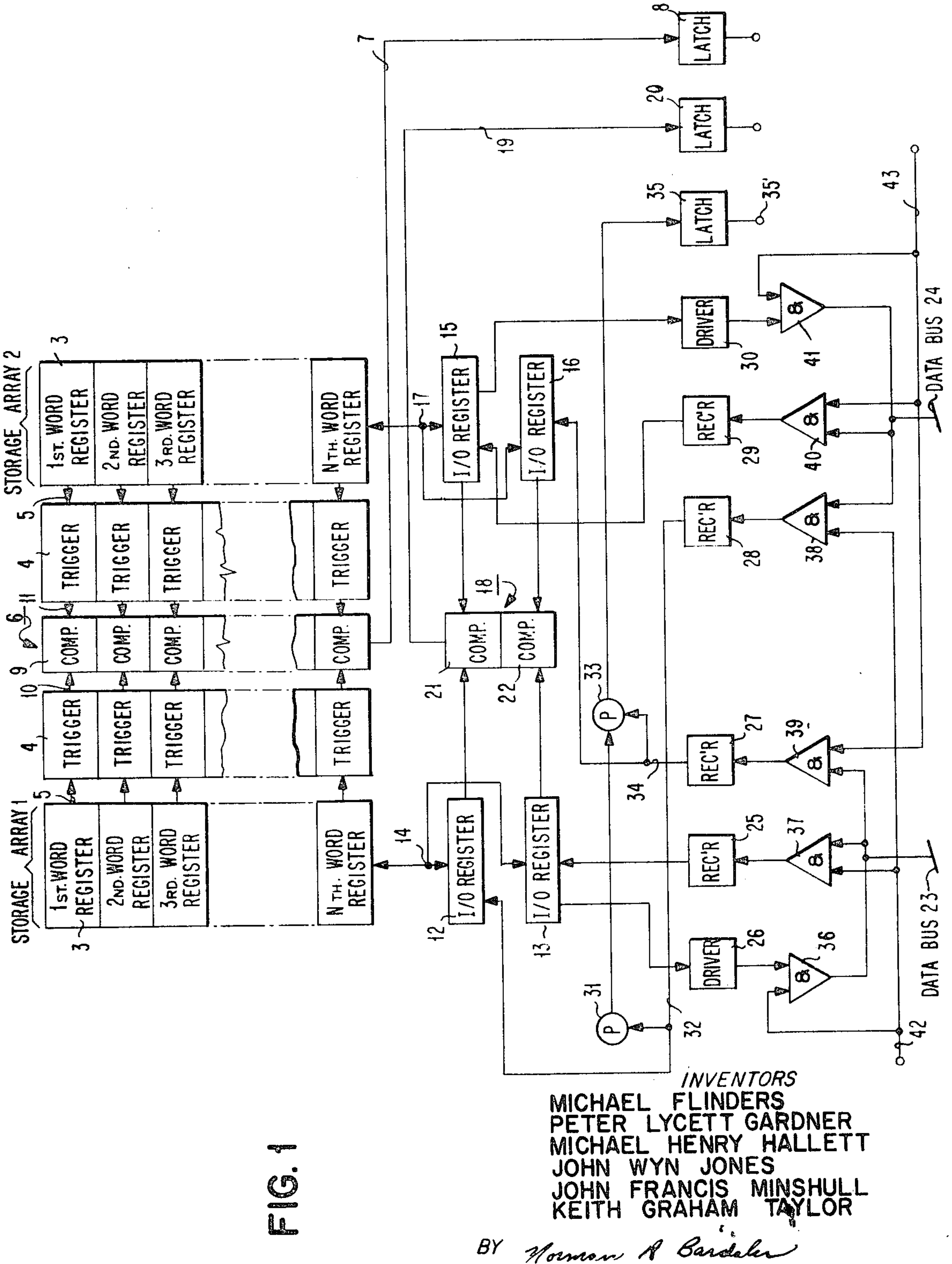
FIG. 1 is a block diagram of an associative storage system incorporating error-detecting circuitry according to the invention.

Referring to FIG. 1 of the drawings, an associative storage system is shown comprising first and second duplicated arrays 1 and 2 of N word registers, e.g., respective first registers 3 of arrays 1 and 2. It is to be understood that each array may consist of many word registers, the number of orders in each register being equal. Each word register is connected to a selector trigger, e.g., trigger 4, which is set to a predetermined stable state as the result of the contents of the word register to which it is connected matching an input search argument to the associative store. The connection of a selector trigger to a word register is by way of a word line, e.g., word line 5, which is connected in parallel to all the data storage cells, not shown, of the word register. The word register emits, i.e., produces, a signal causing the selector trigger to which it is connected to assume the predetermined stable state only if the contents of the particular register match the input search argument. Since the storage array 2 is a duplication of storage array 1, to each word register in array 1 corresponds a unique, i.e., exclusive, word register of array 2. The states of the selector triggers associated with each such corresponding pair of word registers are compared in a comparison means 6 which emits, i.e., produces, an error signal on a line 7 if the states of the triggers of any corresponding pair of selector triggers differ. The error signal on line 7 sets a latch 8, thereby staticising the error indication. The comparison means 6 comprises a set of comparison circuits, e.g., circuit 9. Each comparison circuit has as inputs the state of the selector trigger associated with a word register of array 1, and the state of the selector trigger associated with the corresponding word register of array 2. Thus, as shown in FIG. 1, for example, the inputs of circuits 9 are connected via respective conductors 10 and 11 to the outputs of triggers 4, which are associated with the first circuits 3 of arrays 1 and 2. The outputs, not shown, of the comparison circuits are commoned to the line 7.

Associated with the array 1 are first and second data registers 12 and 13, respectively. Each data register has the same number of orders as one of the word registers of the arrays 1 and 2. As indicated schematically by the bidirectional arrowed and bifurcated line 14, data transfer can take place in either direction between a data register 12 or 13 and any selected word register of array 1, i.e., either data register 12, 13 is an input/output register of the array 1. Associated with the array 2 are first and second data registers 15 and 16, respectively, which are duplicates of the data registers 12 and 13, respectively. The bidirectional arrowed and bifurcated line 17 indicates that the data registers 15 and 16 are input/output registers of array 2. A comparison means 18 compares the contents of the pair of respective first data registers 12 and 15, and the contents of the pair of respective second data registers 13 and 16, and produces an error signal on line 19 if the contents of a register of a pair is found to differ from the contents of the other register of the pair. The error signal on line 19 sets a latch 20, thereby staticising the error indication. Comparison means 18 comprises a first set of comparison circuits which set is shown in FIG. 1 for sake of clarity as a single block 21. Each comparison circuit of the set compares the data content of a different respective order of data register 12 and the corresponding order of data register 15. Comparison means 18 further comprises a second set of comparison circuits, shown in FIG. 1 for sake of clarity as a single block 22. Each comparison circuit of the second set compares the contents of a different respective orders of data register 13 and the corresponding order of data register 16. The outputs, not shown, of all the compare circuits are commonly connected to line 19.

Data transfer can take place in either direction between one of the data registers of one of the aforementioned pairs and an exclusive one of two data buses 23 and 24. Likewise data can take place in either direction between one of the data registers of the other of the aforementioned pairs and the other data bus. More specifically, data from bus 23 is transferred to second data register 13 by way of a set of data receivers, shown in FIG. 1 as a single block 25 for sake of clarity. Data is transferred from register 13 to bus 23 through a set of data drivers, shown in FIG. 1 as a single block 26 for sake of clarity. Second data register 16, the duplicate of second data register 13, is connected to bus 23 through a set of receivers shown in FIG. 1 in block form as a single block 27 for sake of clarity.

Thus, of the data registers 13 and 16, both can receive data from bus 23 but only data from register 13 can be transmitted to the bus 23. Data bus 24 is connected to first data register 12 only through a set of receivers again shown in FIG. 1 as a single block 28. Data bus 24 is connected to the duplicate first data register 15 through a set of receivers shown as block 29, and through a set of drivers shown as block 30. Thus, of the registers 12 and 15, both can receive data from bus 24, but only data from register 15 can be transmitted to the bus 24. Looking at this feature from a different aspect it can be said that storage array 1 is the data source for bus 23 and storage array 2 is the duplicate backup store for bus 23; whereas, storage array 2 is the data source for bus 24 and storage array 1 the duplicate backup store for bus 24.

The drivers 26, 30 and receivers 25, 27–29 are conventional in design and will not be described in detail. By way of example, in operation in response to the combination of a clock signal and the input of a binary one, from the data register in the case of a driver or from the connected data transfer bus in the case of a receiver, a driver or receiver as the case may be transmits a binary one. If the data input is a binary zero to a driver or receiver, the particular driver or receiver is inoperative. Clearly, the alternative of transmitting only binary zeros could have been chosen as is apparent to those skilled in the art.

A parity circuit 31, to be described later, receives as inputs the signals on the lines, shown as single line 32 for sake of clarity, which connect receiver circuits 28 to data register 12. A parity circuit 33 receives as inputs the signals on lines 34, shown as single line 34, which connect receiver 27 to data register 16. Parity circuits 31 and 33 are connected in series to a latch 35, which is set to indicate an error when the parity of the data on either of the lines 32 or 34 is incorrect.

AND circuits 36 to 41, which are connected between the receivers and drivers and the buses 23 and 24, allow either or both arrays to be isolated from the buses. As shown AND circuits 36 to 38 are two-input circuits each having as one input a control line 42 which when deenergized causes the isolation of data registers 12 and 13, and thus array 1, from buses 23 and 24. Similarly, AND circuits 39 to 41 have as an input a control line 42 which when deenergized causes the isolation of data registers 15 and 16, and thus array 2, from the data buses 23 and 24.

Figure 2:
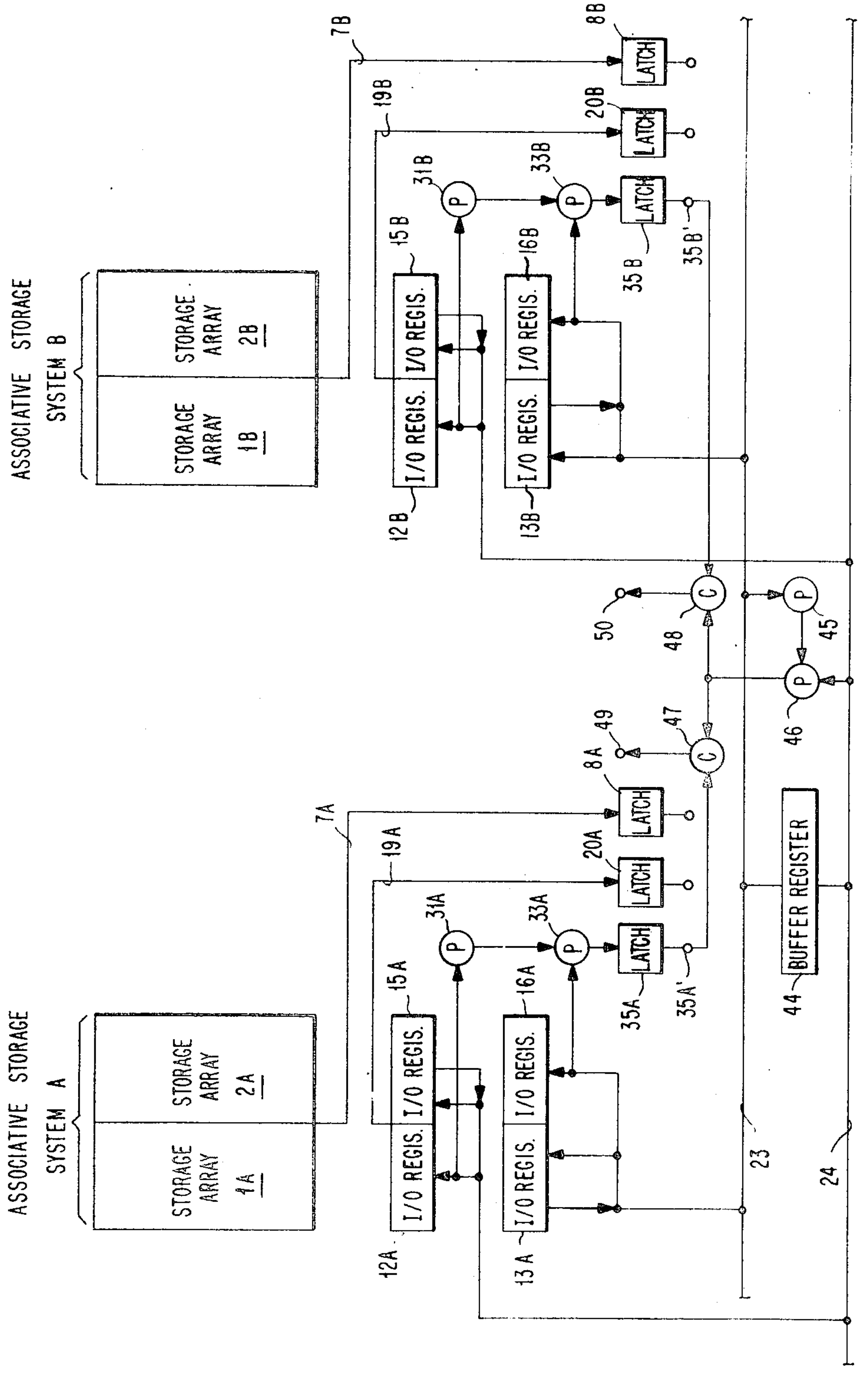
FIG. 2 is a block diagram illustrating how plural storage systems, such as the single system shown in FIG. 1, are connected to common data transfer buses.

Before describing how the error detecting system operates it is relevant to indicate how the associative storage system of FIG. 1 is incorporated in a larger, i.e., plural, system. It is assumed that several stores, i.e., memories, which need not all be associative stores, are connected in parallel to the data buses 23, 24. Referring to FIG. 2, by way of example, two associative storage systems systems A and B, each of which is configured similar to the system of FIG. 1, are connected in parallel to the buses 23 and 24. The storage systems are shown in more schematic form in FIG. 2 than in FIG. 1 for sake of clarity in order to highlight the data flow between the storage systems and the buses, and like elements in the two systems are distinguished by the reference character suffixes A and B. Moreover, in FIG. 2 corresponding elements of the systems A and B are provided with reference characters having numerical portions similar to the reference numerals used for the corresponding elements of the system shown in FIG. 1. However, for sake of clarity, in FIG. 2, in system A the circuitry and interconnections between the arrays 1A and 1B, which correspond to the triggers, e.g., trigger 4, and comparison means 6 and their respective interconnections shown in FIG. 1, have been omitted. In addition, in FIG. 2, system A other elements of system A have been omitted for clarity as follows: the interconnections between the register 12A and storage array 1A and the interconnections between register 15A and storage array 1B which corresponds to the interconnections 14 and 17, respectively, of FIG. 1; the circuitry and interconnections between the registers 12A and 15A and between registers 13A and 16A, which corresponds to the comparison means 18 and its respective interconnections of FIG. 1; and the circuitry and interconnection between the data buses 23 and 24 and the respective registers 12A, 13A, 15A, and 16A which corresponds to the circuitry 25–30 and 32, 34, and 36–43 of FIG. 1. For sake of clarity, similar omissions of corresponding circuitry and interconnections have been provided in FIG. 2 with respect to system B. Means are provided to transfer data between the buses 23, 24, and this is shown as a buffer store 44 which comprises a single register of appropriate size. In practice, data transfer between the buses may necessitate transfer through a larger store, e.g., main storage, which has input/output connections to each bus. Conventional gate circuitry, not shown, is provided to control data transfer between the buses through buffer 44.

FIG. 2 also shows an additional checking device for ensuring, as will be explained, that the connections between each storage system and the data buses are good. The parity of data on bus 23 is generated by a parity circuit 45, and the parity of data on bus 24 is generated by a parity circuit 46. The output of circuit 45 is connected as input to circuit 46. The output of parity circuit 46 is connected as input to comparators 47, 48, which respectively, also have as inputs the outputs of parity generating circuits 33A and 33B. Should the parities not match the comparators 47 or 48 produce error signals on terminals 49, 50 respectively. It should be noted that this parity check arrangement operates irrespective of whether the parity of words in a storage system is correct or not. The arrangement is to check that connections between the storage systems and the buses are good.

Operation of the storage system will now be described. The associative store has an operation cycle of two phases, search and read or write. To fix ideas, consider only storage array 1. In the search plate, data in a selected data register 12 or 13 is selectively masked, by a masking arrangement, not shown, and the unmasked bits are applied as search argument in parallel to all the word registers of array 1. Since masking arrangements are well known their description will not be given here. A suitable arrangement is described in a copending application Ser. No. 825,455 filed Oct. 23, 1968, entitled "Associative Memory" Peter A. E. Gardner et al., and assigned to the same Assignee herein. If the search argument is matched by the contents of any of the word registers, e.g., register 3 of array 1, the word line, e.g., line 5 of array 1, of each such register produces a signal which causes the connected selector trigger, e.g., trigger 4 associated with register 3 of array 1, to be set. During the read or write phase, if a read is requested, the contents of each word register with a selector trigger set are transferred simultaneously to a selected data register 12 or 13, or if a write is requested the contents of a selected data register is written into each word register with the connected selector trigger set. It will be noted that, when several word registers are selected, the read operation is an OR operation on the contents of the selected registers and a parity check of the data in the data register subsequent to a read operation will, in general, be ineffective. Subsequently, as will be explained, data is transferred between the data register and the buses.

An additional feature of the storage system is the provision of a so-called "next" operation. The selector triggers of each array are connected together in the manner of a shift register and the state of each selector trigger can be transferred in a "-next" operation to the adjacent trigger in the direction running from the top to the bottom of the array, as shown in FIG. 1. The "next" operation is effected during the search phase, can be performed with or without a search operation, and is followed by the read/write phase. A more detailed description of the "next" operation can be found in the aforementioned application Ser. No. 825,455, which is incorporated by reference herein.

The two phases will now be described in more detail.

1. THE SEARCH PHASE

Figure 3:
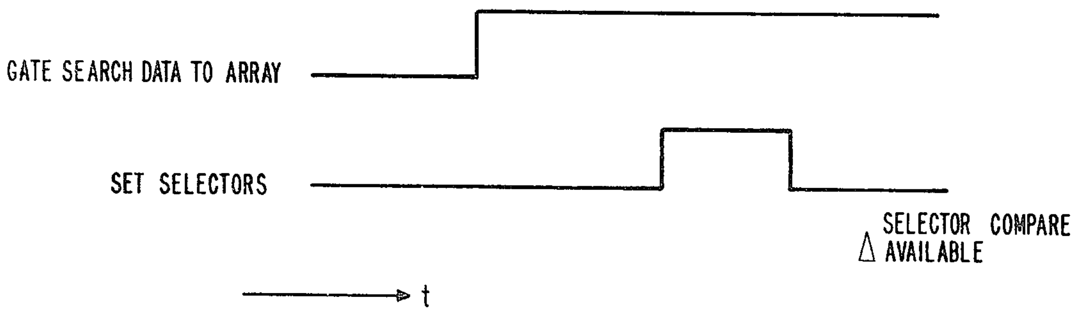
FIGS. 3 and 4 are timing diagrams.

It is assumed that identical data is in the duplicate data registers, for example, 12 and 15 from which identical search arguments are to be supplied to the arrays 1 and 2. At an early stage in the search phase, see FIG. 3, the search arguments are gated to the arrays 1 and 2. After a time long enough to allow the state of word lines, e.g., lines 5, to settle, control signals are provided which cause the selector triggers, e.g., triggers 4, connected to the energized word lines to be set. Shortly after the selector triggers have been set and just before the end of the search phase comparison means 6 will provide an error signal on line 7, thereby setting latch 8, if the states of the selector triggers connected to corresponding word registers 3 of arrays 1 and 2 are not the same.

An error signal, however generated, will result in a machine stop and an attempt to repair the error.

2. THE READ/WRITE PHASE a. Read

Figure 4:
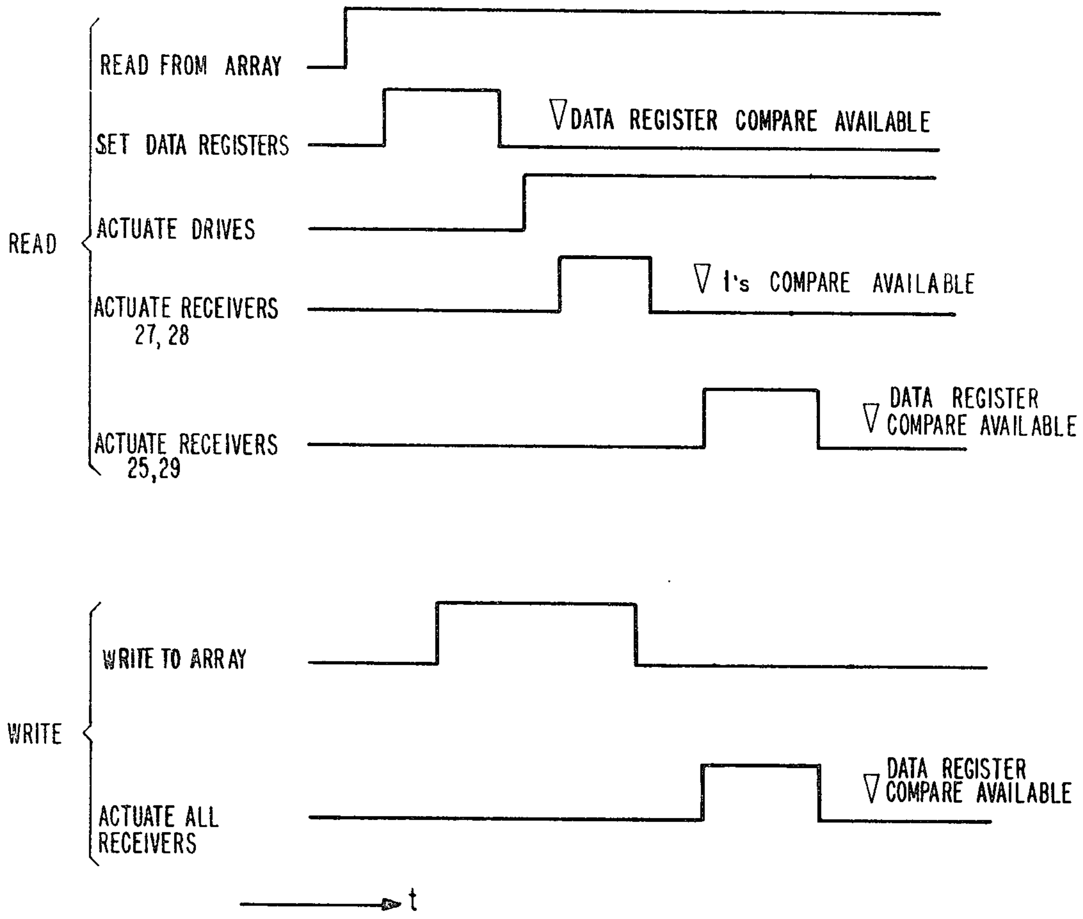

If a read operation is called for, the data registers are first reset, unless this action is specifically inhibited, and the data in word register of arrays 1 and 2 having connected selector triggers set is read out simultaneously to a specified data register pair, for example, registers 12 and 15, c.f. FIG. 4. The choice of data register pair implies the choice of data transfer bus, since registers 12 and 15 are connected only to bus 24 and registers 13 and 16 are connected only to bus 23. When the states of the storage cells in the data registers have settled, compare circuit 21 provides an error signal thereby setting trigger 20, if the data content of any order of register 12 differs from the content of the same order of the register 15.

During the last part of the read phase it is necessary to transfer the data in the data registers to the data buses and to receive data from the buses in readiness for the next select phase. First, the drivers 26 and 30 are actuated. The driver circuit is such that it operates to transmit to the connected bus a signal representing a binary 1 if the order of the data register to which it is connected contains a binary 1, but otherwise the driver does not operate. Just after the driver circuits are actuated the receiver circuits 27 and 28 are also actuated, see FIG. 4. These receivers are, as shown in FIG. 1, those connected to the data registers 12 and 16 which do not have the capability of transferring data from the register to a bus. Data register 12 is receiving at this time not only binary ones from the drivers 30 via receiver 28 and gates 38 and 41 but also the binary ones emitted onto the data bus 24 by other stores such as the systems A and/or B as shown in FIG. 2, working in synchronism with the storage system shown in FIG. 1. A straight comparison check between the data registers 12 and 15 would, in general result in a false error indication. Accordingly, the comparators 21 are caused to operate so as to determine if, for each binary one bit in register 15, there is a one bit in register 12. If this is not so, it can be deduced that one of the drivers 30 has not correctly transmitted a one to the bus. The drivers and receivers 26 and 27 connected to bus 23 are similarly operated, but assuming that the registers 13, 16 are cleared at the beginning of the read phase, the drivers 26 do not operate since register 13 contains no ones and the effect is that register 16 receives data transmitted onto bus 23 by other stores or storage systems. As data is being transmitted by receivers 27 and 28 to the registers 12 and 16, parity circuits 31 and 33 are operating on the data and are effective to generate the parity of all the data being transferred from the buses, which parity is applied to terminal 35′. The signals at the terminals corresponding to terminal 35′ of FIG. 1, of all the storage systems connected to the buses 23 and 24 are compared at this time with the parity of data on the buses. The latter parity, see FIG. 2, is generated by parity circuits 45 and 46 and is compared with the signals on terminals 35A′ and 35B′ in comparators 47 and 48, respectively. If the parities do not match an error signal is generated at the terminal 49 or 50 connected to the comparator detecting the mismatch. This parity check detects faulty connections between the buses and the storage systems. When sufficient times has elapsed for the ones check error signal to issue, receivers 25 and 29 are actuated to transmit data from the buses to registers 13 and 15. Comparators 21 and 22 now operate in comparison mode to detect that each pair of data registers holds identical data. If this is so, the data registers are ready for the next search phase.

b. Write

In a write phase the drivers are not operated and so the comparators 21 and 22 are not required to operate to check ones only.

Early in the write phase data is gated from the selected pair of I/O data registers to the word registers of the duplicate arrays which have their selector triggers set. This having been done, the data registers are cleared and all receivers are actuated simultaneously so that data on the data buses 23 and 24 is transferred to the data registers for the next search phase. As in a read phase, a parity check is made by comparing the parities of data on the buses and the data being received by the data register, and the contents of the data registers are compared by circuits 21 and 22.

One cause of error so far not mentioned is the possibility that a driver circuit may be constantly providing a binary one. This error is detected by applying an inhibit driver signal to all driver circuits of all storage systems connected to the buses and then generating the parity of the data on the buses. The parity should be zero and if it is one a driver failure has occurred. This check takes place at the end of the search phase after the selector comparison is available.

When an error is detected by the system an attempt is made to diagnose the fault and, if possible, to correct it. With the system described hereinafter, although several storage systems may be connected to the same data transfer buses, the use of error latches 8 and 20, and the parity error terminals 49, 50, each terminal being unique to a particular one of the storage systems, enable immediate detection of the storage system giving rise to the error. Since many errors which arise are transient errors, the first recovery procedure is to retry the storage cycle which gave rise to the error. This is repeated several times, if necessary.

If retry is unsuccessful and if the error can be attributed to data errors, word refreshment is attempted. This involves the replacement of an incorrect word by the word from the corresponding word register of the duplicate array. Following word refreshment, retry is again attempted and if this is unsuccessful, the storage system is isolated from the buses by deenergizing lines 42 and 43.

Once an error has been signalled, it is necessary to determine in which of the arrays and associated circuitry the error arose.

The machine is stopped and control is transferred to a diagnostic routine.

Figure 5:
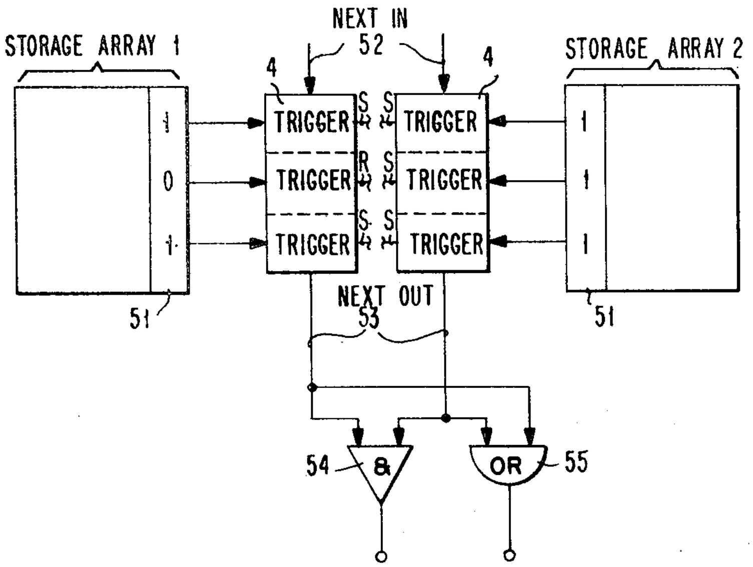
FIG. 5 is a block diagram illustrating part of the error recovery process.

One binary order of each array, called the diagnostic column 51, c.f. FIG. 5, is reserved for diagnostics and is normally clear. At the beginning of the diagnostic routine, after several retries as explained above, the states of the selectors are copied into the diagnostic columns 51 of arrays 1 and 2. A binary one is placed in the appropriate order of a pair of data registers, for example 12, 15, and a write operation with only this column unmasked is performed. The result is, as shown in FIG. 5, that where a selector trigger 4 represented by the reference character 3, a binary one is written into the diagnostic column of the connected array, but that, where a selector trigger 4 is reset a binary zero is in the diagnostic column. For clarity, only three pairs of selectors are shown in FIG. 5.

Three errors signals are available which indicate respectively that there is a parity error, that the contents of a pair of data registers are not identical, and that the settings of a pair of selector triggers are not identical. If there is a parity error, it can be deduced, as explained above, that a connection between the storage system and the buses is bad. If the error recurs after retry, the error is uncurable and the system is isolated from the buses by deenergizing lines 42 and 43. If during a write phase, the contents of a pair of registers are not found to be identical and there is no parity error, then the fault can be attributed to the data register and, again, is incurable. The system is then isolated from the buses. There remain errors due to a mismatched pair of selectors and to mismatched data register contents during a read phase. Assume that the error signal indicates mismatched selectors.

The first diagnostic process in this case is to check the working of the "nexting" operation. The selector trigger 4 connected to both arrays 1 and 2 are reset and signals are applied on the NEXT IN lines 52 and set the top most selector of each array. A sequence of "next" operations, with no read or write operation, is then performed to cause the set state to travel down each chain of selector triggers. The set state of the bottom selector triggers is transmitted onto respective lines NEXT OUT 53. The NEXT OUT lines 53 are connected as respective inputs to an AND circuit 54 and an OR circuit 55. The output from OR circuit 55 indicates whether the set state has been transferred through at least one selector trigger chain and is used to stop the sequence of "next" operations and the output of the AND circuit 54 indicates whether the set states in each chain were transferred out of the selector triggers simultaneously. If the outputs of both circuits are up simultaneously, it is assumed that the "nexting" transfer operation is good, but if only the output of OR circuit 55 is up, even after several retries, it is assumed that there is an incurable fault and the storage system is isolated from the buses 23 and 24 by deenergizing lines 42 and 43.

Even after getting an output from AND circuit 54 it is possible that the selector triggers have not been resetting correctly so that, although a set state has been correctly transferred along the chains of triggers, one or more word registers are marked at the end of the check which should leave none marked. Accordingly, at the end of the "nexting" check, a read operation is performed which should result in nothing being read to the data registers. Since it is unlikely that both "-nexting" chains would simultaneously develop the same error, the comparison means 18 will signal a selector trigger resetting error. Such an error is incurable and results in the storage system being isolated from the buses as described above.

Assuming that the "nexting" operation is found to be good, the next stage of the diagnostic process is to find out which pair of selectors have mismatched. This is done by using the diagnostic columns 51. With all the selectors reset, a sequence of next-read operations are performed, with the read mask being such that only the diagnostic column entries are read into the data registers. A next-read operation causes, in the select phase, the states of the selectors to be transferred, and in the read phase, a read out to the data register of the contents, selected according to the read mask, of the word registers thus marked. For a reason which will become clear later, the readout is to both pairs of data registers. In this case, the first "next" signal is generated on the NEXT IN line 52 and causes selection of the top most pair of word registers. As each read operation is completed a comparison of the contents of the data registers takes place by circuits 21 and 22 depending on the register selected. Clearly, when the contents of the diagnostic strip differ, a mismatch or error signal will be provided by the comparison circuits. The mismatching pair of selector triggers which gave rise to the selector error signal, has now been found. When a mismatch signal issues, the next-read sequence is stopped and the mask is changed to permit readout from the arrays 1 and 2 of the complete contents of the word registers.

This is done and the parity of the words in the registers is checked, as by a parity circuit, not shown, connected to each register. If the parity of both words is correct, the assumption is made that the fault is in the logic circuitry which causes the selector to be set when a match between a search argument and the contents of a register is found during a search phase. Such a fault is incurable. If the parity of one of the words is correct, word refreshment is effected. Assume that the parity of the word in register 15A of FIG. 2 is correct and that the parity of the word in register 12A is incorrect. The word in register 15A is written, by way of bus 24, into buffer 44, the registers 12A and 15A are cleared, and the contents of buffer 44 are transferred to register 12A. If the parity in register 15A is incorrect the contents of register 13A are transferred by way of bus 23, buffer 44 and bus 24 to register 15A, register 15A having meanwhile been cleared.

Since the selector trigger is still marking the word register from which the erroneous data was read, the refreshed contents of register 12A or 15A, whichever was found to contain a parity error, are written back into the array 1 or 2, respectively.

The cycle giving rise to the error is now retried and if the error still occurs it is deduced that the error lies in one of the data cells of the failing array, in which case the error is incurable and the storage system is isolated.

If a data register compare error is provided on a read phase, a similar diagnostic process determines if the error is transient, lies in the read logic of an array, or is a driver error. The techniques of error recovery for use with the storage system described employs techniques similar to those described above for selector error diagnosis.

Figure 6:
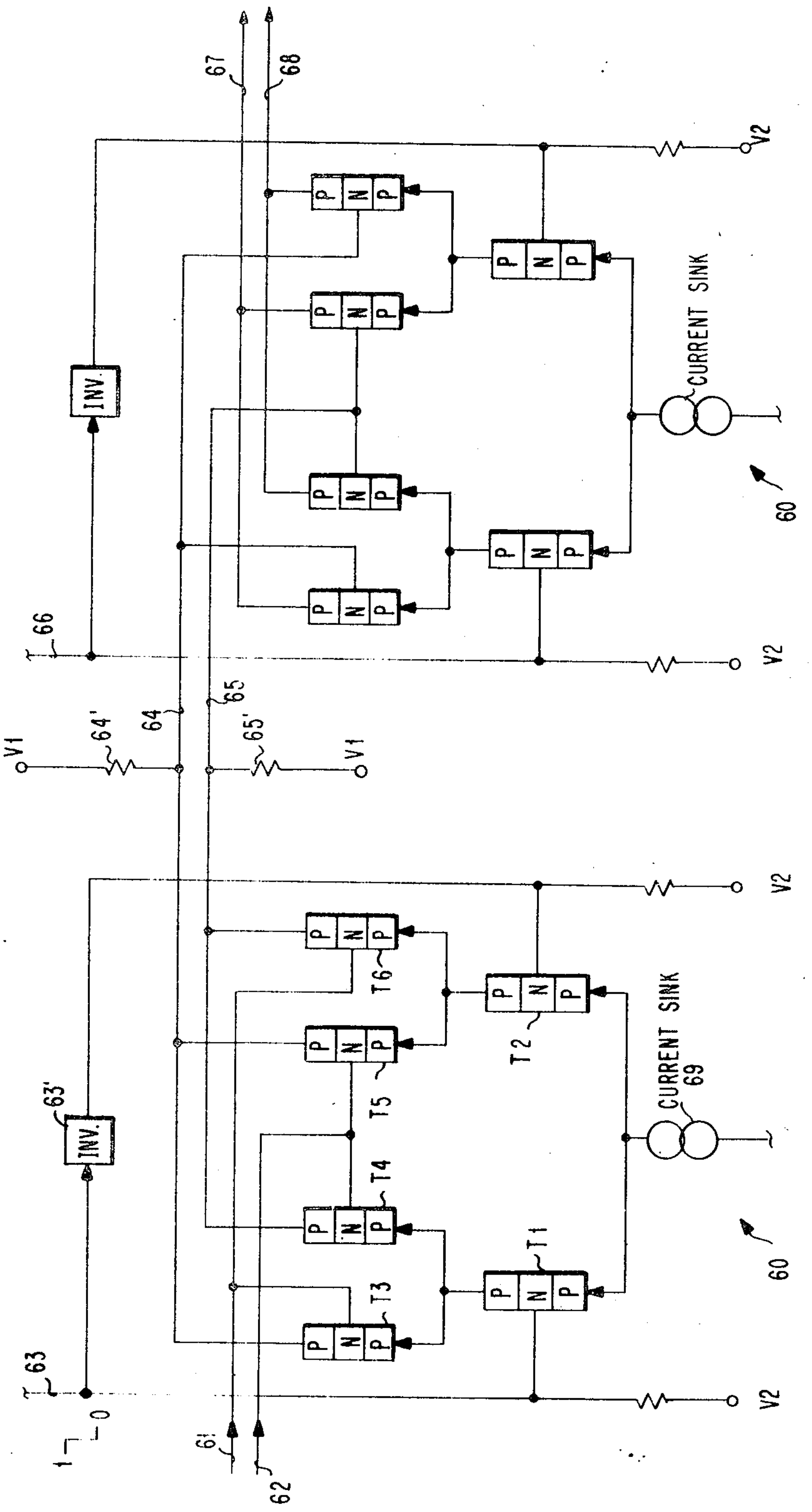
FIG. 6 is a circuit diagram of part of a parity circuit.

FIG. 6 shows part of a parity generating circuit suitable for use in the storage system of FIG. 1. The circuit comprises a number of series-connected stages 60, one stage for each bit of the number of which the parity is to be generated. An incoming parity is represented by the relative binary voltage levels of the two lines 61 and 62. A signal on line 63 representing a binary data bit controls the tree network of transistors T1 to T6 to generate a parity on lines 64 and 65 as input to the next stage 60 which provides a parity signal on lines 67 and 68 in accordance with the inputs of lines 64 and 65 and bit line 66. The tree network of the left-hand tage 60 of FIG. 6 is connected to a current sink 69. The first level consists of PNP transistors T1 and T2 having their emitters connected to the current sink. Line 63 is connected to the base of transistor T1. Connected to line 63 through an inverter 63' is the base of transistor T2. The second level of the tree comprises transistors T3 to T6. The emitters of transistors T3 and T4 are connected in parallel to the collector of transistor T1, while the emitters of transistors T5 and T6 are connected in parallel to the collector of transistor T2. Line 61 is connected to the bases of transistors T3 and T6, line 62 is connected to the bases of transistors T4 and T5, line 64 is connected to the collectors of transistors T3 and T5, and line 65 is connected to the collectors of transistors T4 and T6. Lines 64 and 65 are connected through the respective resistors 64', 65' to potentials V1.

In operation, line 63 up represents a binary one, and necessitates a change of parity. Transistor T1 is conducting. If line 61 is up and line 62 is down, representing by way of example a parity of one, transistor T3 is conducting and transistor T4 is nonconducting. As a result line 64 is down and line 65 is up, which represents a parity of 0. If line 63 is down, representing binary zero, inverter 63' is up causing transistor T2 to conduct. If line 61 is up and line 62 is down, transistor T6 is conducting and transistor T5 is nonconducting. As a result line 64 is up and line 65 is down. The parity is passed unchanged to the next stage. In order to check the parity of a data word, such for example that the parity is even, a predetermined parity-representing signal is put on the input lines 61, 62 of the input stage 60 and a check is made that the signals on output lines 67, 68 of the output stage 60 represent the same parity.

Figure 7:
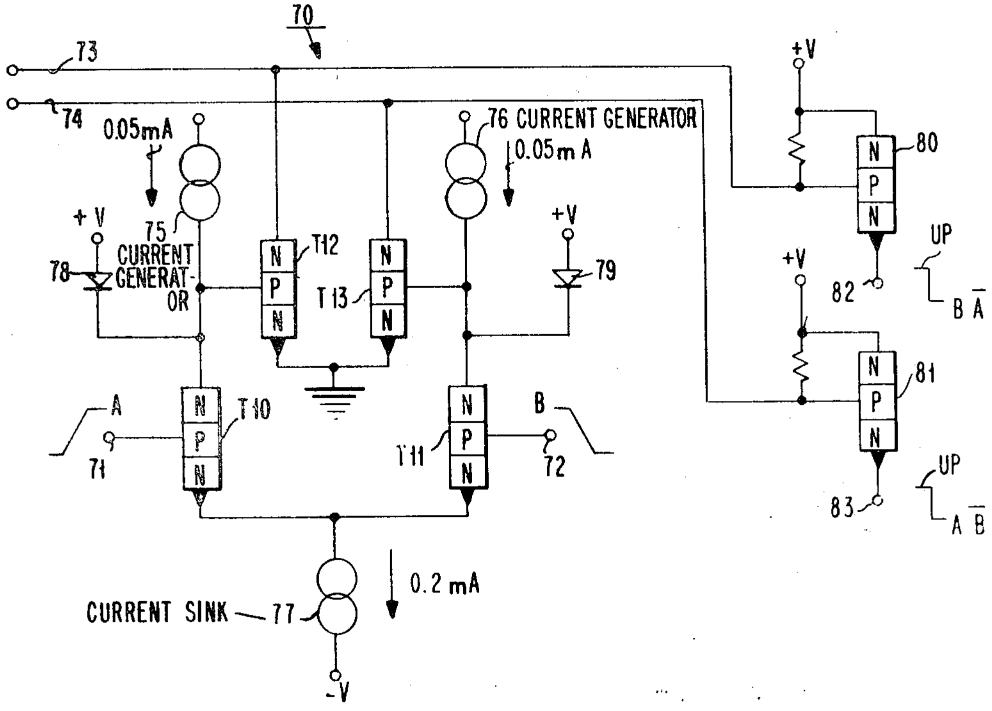
FIG. 7 is a circuit diagram of part of a comparison circuit.

FIG. 7 shows a comparison circuit 70 suitable both for comparing the inputs on terminals 71 and 72 and for indicating that the signal on a given terminal represents a binary one and differs from a signal on the other terminal. Binary one is represented by a relatively positive signal, e.g., level A or B as the case might be. The circuit 70 forms one order of the comparators 21, 22 shown in FIG. 1. The comparators 9 which compare the selector triggers can be of simpler known construction. Lines 73 and 74 are connected in parallel to each comparison circuit 70 of the comparator 21 or 22. NPN transistors T10 and T11 are respectively connected between equal current sources 75 and 76, supplying as shown, for example, a current of 0.05 mA, and a current sink 77 which draws, for example, 0.02 mA. Transistors T12 and T13 are connected between respectively lines 73 and 74, and ground. The base of transistor T12 is connected to current source 75 and the base of transistor T13 is connected to current source 76. A clamp circuit, shown schematically as diode 78, is connected to the collector of transistor T10 and the base of transistor T12. Similarly, a clamp circuit, shown schematically as diode 79, is connected to the collector of transistor T11 and the base of transistor T13. Emitter followers 80, 81 are connected to lines 73, 74, respectively, and to power output terminals 82, 83, respectively. Line 73 is biased so that if transistor T12 of circuit 70 is nonconducting, or any such corresponding transistor of any other similar connected comparison circuit is nonconducting, a relatively positive signal appears at terminal 82; whereas, if transistor T12 is conducting a relatively negative signal is provided at terminal 82. For similar conditions with respect to line 74 and transistor T13, appropriate signal levels are provided at terminal 83 in accordance with the particular state of transistor T13.

In operation, transistors T10 and T11 both conduct as long as the signals on terminals 71 and 72 are equal. The transistors T10 and T11 will however draw different currents due to their inevitable slightly different operating characteristics and the circuit is designed so that whichever transistor draws the least current, it still draws all the current from its particular source 75 or 76. Any excess current is supplied by the clamps 78 and 79. With equal signals on terminals 71 and 72, transistors T12 and T13 are cut off and the potentials on terminals 82 and 83 are high, i.e., in the up states. If the signal on one terminal 71 or 72 differs from the signal on the other terminal, one of the transistors T10 or T11 is cut off and one of the transistors T12 or T13 is turned on, causing the potential on one of the terminals 82 or 83 to fall. For example, if the potential on terminal 72 falls while the potential on terminal 71 remains high, transistor T10 supplies all the current to sink 77, resulting in transistor T11 being cut off and transistor T13 becoming conductive. The potential on terminal 83 falls to the indicated level $\overline{AB}$.

When circuit 70 is simply comparing the contents of two data registers, the relatively negative signals on both terminals 82 and 83 are significant in representing an error. When, however, circuit 70 is performing a "ones check" only the signal from one of the terminals is used. If, for example, terminal 71 is connected to an order of data register 13 and terminal 72 to an order of data register 16 only relatively negative signals on terminal 83 represent an error.

Instead of the two data registers for each storage array hereinbefore described, any number can be provided in accordance with the number of data transfer buses to which it is desired to connect the array.

Thus, while the invention has been particularly shown and described with reference to preferred embodiments thereof, it will be understood by those skilled in the art that various changes in form and details may be made therein without departing from the spirit and scope of the invention.

We claim:

1. Error-detecting circuitry comprising first and second equal-order binary data storage registers, comparison means connected between the registers, a data transfer bus, data driver circuitry arranged in operation to transmit binary bits of the same predetermined binary state to the data bus in accordance with the contents of the first data register, first data receiver circuitry arranged in operation to transmit binary bits of said predetermined state to the first data register in accordance with the data on the data transfer bus, and second data receiver circuitry arranged in operation to transmit binary bits of said predetermined state to the second data register in accordance with the data on the data transfer bus, wherein the data driver circuitry and the second data receiver circuitry are operated simultaneously and the comparison means is arranged upon operation of the data driver circuitry to provide an error signal in the absence of a binary bit of said predetermined state in any order of the second data register when the same order of the first data register contains a binary bit of said predetermined state.

2. Error-detecting circuitry according to claim 1, wherein the first receiver circuitry is operated subsequent to the second receiver circuitry, and the comparison means then provides an error signal if the contents of any order of the first data register differ from the contents of the same order of the second data register.

3. Error-detecting circuitry according to claim 1 further comprising a first parity circuit arranged to generate the parity of the data on the data transfer bus, a second parity circuit arranged to generate the parity of the data transmitted from the data transfer bus to the second data register, and a parity comparison circuit which provides an error signal when the parities generated by the first and second parity circuits differ.

4. Error detecting circuitry according to claim 1 wherein said comparison means comprises:

a comparator circuit for each pair of corresponding orders of said pairs of first and second equal-order binary data storage registers, and wherein each of said comparator circuits further comprises first and second semiconductor control means responsive to the binary states of said respective corresponding orders of said first and second registers, respectively, said first and second semiconductor control means having first and second outputs, respectively, for providing predetermined control signals thereat, and first and second semiconductor indicating means responsive to such first and second control signals for providing first and second output signals indicative of the binary states of said corresponding orders of said first and second registers, respectively, said output signals during the presence of an error bit in one of said corresponding orders having a predetermined relative characteristic indicative of the particular one of the corresponding orders containing the error bit.

5. Error detecting circuitry according to claim 3 wherein each of said parity circuits further comprises a number of stages corresponding to the number of orders of the data for which parity is to be generated thereby, each said stage comprising:

current sink means; and first, second third, fourth, fifth and sixth transistors, each of said transistors having input means, output means, and common electrode means associated therewith, the common electrode means of said first and second transistors being commonly connected to said current sink means, the common electrode means of said third and fourth transistor being commonly connected to the output means of said first transistor, the common electrode means of said fifth and sixth transistors being commonly connected to the output means of said second transistor, the input means of said first and second transistors being responsive to first and second complementary input signals, respectively, indicative of the binary data bit of the corresponding order of the data, the input means of said third and sixth transistors being commonly connected and responsive to a first parity control signal, the input means of said second and fourth transistors being commonly connected and responsive to a second parity control signal, the output means of said third and fourth transistors being commonly connected to provide a first output signal thereat, the output means of said fourth and sixth transistors being commonly connected to provide a second output signal thereat, the relative characteristics of said first and second output signals being indicative of the parity of said particular bit;

wherein each of said stages are serially connected whenever said number of states is greater than one, the input means of the third and sixth transistors of a preceding stage being responsive to the first output signal of a succeeding stage, and the input means of the fourth and fifth transistors of a preceding stage being responsive to the second output signal of a succeeding stage; and bias means for biasing said transistors.

6. An associative storage system including at least one pair of a first and second storage arrays of word registers, the second stage array being a duplicate of the first, said system further comprising:

error detecting circuitry associated with each said pair of arrays, each said error-detecting circuitry comprising first and second equal-order binary data input/output storage registers connected to said first and second arrays, respectively, associated therewith, comparison means connected between the registers, a data transfer bus, data driver circuitry arranged in operation to transmit binary bits of the same predetermined binary state to the data bus in accordance with the contents of the first data register, first data receiver circuitry arranged in operation to transmit binary bits of said predetermined state to the first data register in accordance with the data on the data transfer bus, and second data receiver circuitry arranged in operation to transmit binary bits of said predetermined state to the second data register in accordance with the data on the data transfer bus, wherein the data driver circuitry and the second data receiver circuitry are operated simultaneously and the comparison means is arranged upon operation of the data driver circuitry to provide an error signal in the absence of a binary bit of said predetermined state in any order of the second data register when the same order of the first data register contains a binary bit of said predetermined state.

7. An associative storage system according to claim 6 wherein the first receiver circuitry is operated subsequent to the second receiver circuitry, and the comparison means then provides an error signal if the contents of any order of the first data register differ from the contents of the same order of the second data register.

8. An associative storage system according to claim 6 further comprising a first parity circuit arranged to generate the parity of the data transfer bus, a second parity circuit arranged to generate the parity of data being transmitted from the data transfer bus to the second data register, and a parity comparison circuit which provides an error signal when the parities generated by the first and second parity circuits differ.

9. An associative storage system according to claim 6 wherein each word register of each array of a same pair of arrays is connected to a respective selector trigger which is set to indicate selection of the word register for accessing as a result of an associative search operation, and including selector comparison means for comparing the states of each pair of selectors connected to corresponding word registers of the arrays, which selector comparison means is arranged to provide an error signal when the states of any said pair of selector triggers differ.

10. An associative storage system according to claim 9 wherein the selector triggers are connected together as a shift register whereby the state of each selector trigger can be transferred to an adjacent selector trigger.

* * * * *